US011715194B2

(12) United States Patent
Ng et al.

(10) Patent No.: US 11,715,194 B2
(45) Date of Patent: Aug. 1, 2023

(54) INFORMATION PROCESSING APPARATUS AND INFORMATION PROCESSING METHOD (71) Applicant: Kioxia Corporation, Tokyo (JP)

(72) Inventors: Youyang Ng, Yokohama (JP); Bo Wang, Yokohama (JP); Takuji Ohashi, Yokohama (JP); Osamu Yamane, Ebina (JP); Takeshi Fujiwara, Yokohama (JP)

(73) Assignee: Kioxia Corporation, Tokyo (JP)

( * ) Notice: Subject to any disclaimer, the term of this patent is extended or adjusted under 35 U.S.C. 154(b) by 316 days.

(21) Appl. No.: 17/191,063

(22) Filed: Mar. 3, 2021

(65) Prior Publication Data
US 2022/0076398 A1 Mar. 10, 2022

(30) Foreign Application Priority Data
Sep. 4, 2020 (JP) .................................. 2020-149253

(51) Int. Cl.
*G06T 7/00* (2017.01)
*G06F 18/214* (2023.01)
(52) U.S. Cl.
CPC .......... *G06T 7/001* (2013.01); *G06F 18/2155* (2023.01); *G06T 2207/20081* (2013.01); *G06T 2207/30148* (2013.01)

(58) Field of Classification Search
CPC .......... G06T 7/001; G06T 2207/20081; G06T 2207/30148; G06T 7/74; G06F 18/2155; G06V 10/82; G06V 10/993
See application file for complete search history.

(56) References Cited

U.S. PATENT DOCUMENTS

2019/0050979 A1 2/2019 Park et al.
2019/0294923 A1\* 9/2019 Riley ..................... G06N 3/045
2019/0362221 A1 11/2019 Ando et al.

FOREIGN PATENT DOCUMENTS

WO WO 2017/117568 A1 7/2017

\* cited by examiner

*Primary Examiner* — Christopher Wait
(74) *Attorney, Agent, or Firm* — Oblon, McClelland, Maier & Neustadt, L.L.P.

(57) ABSTRACT

An information processing apparatus has an acquisitor configured to acquire an entire area image obtained by capturing an entire area of a processing surface of a wafer including at least one defect, a training image selector configured to select, as a training image, a partial image including at least one defect from the entire area image, a model constructor configured to construct a calculation model of generating a label image obtained by extracting and binarizing the defect included in the partial image, and a learner configured to update a parameter of the calculation model based on a difference between the label image generated by inputting the training image to the calculation model and a reference label image obtained by extracting and binarizing the defect of the training image.

20 Claims, 11 Drawing Sheets

X: RANDOM, Y: RANDOM
ar1

X: LEFT END, Y: INTERMEDIATE POSITION
ar2

X: RIGHT END, Y: INTERMEDIATE POSITION
ar3

X: INTERMEDIATE POSITION, Y: UPPER END
ar4

X: INTERMEDIATE POSITION, Y: LOWER END
ar5

X: LEFT END, Y: UPPER END
ar6

X: LEFT END, Y: LOWER END
ar7

X: RIGHT END, Y: UPPER END
ar8

X: RIGHT END, Y: LOWER END
ar9

X: CENTER, Y: CENTER
ar10

X: RANDOM, Y: RANDOM
~ar1

X: LEFT END, Y: UPPER END
~ar6

X: LEFT END,
Y: INTERMEDIATE POSITION
~ar2

X: LEFT END, Y: LOWER END
~ar7

X: RIGHT END,
Y: INTERMEDIATE POSITION
~ar3

X: RIGHT END, Y: UPPER END
~ar8

X: INTERMEDIATE POSITION,
Y: UPPER END
~ar4

X: RIGHT END, Y: LOWER END
~ar9

X: INTERMEDIATE POSITION,
Y: LOWER END
~ar5

X: CENTER, Y: CENTER
~ar10

EXAMPLE OF TRAINING IMAGE

FIG. 9A

EXAMPLE OF REFERENCE LABEL IMAGE

INFORMATION PROCESSING APPARATUS AND INFORMATION PROCESSING METHOD

CROSS REFERENCE TO RELATED APPLICATIONS

This application is based upon and claims the benefit of priority from the prior Japanese Patent Application No. 2020-149253, filed on Sep. 4, 2020, the entire contents of which are incorporated herein by reference.

FIELD

One embodiment of the present disclosure relates to an information processing apparatus and an information processing method.

BACKGROUND

With the progress of a semiconductor process technology, a semiconductor integrated circuit is becoming finer, and even a slight defect on a wafer cannot be overlooked.

Before the wafer is diced, a macro inspection of extracting the defect by capturing an entire area of a processing surface of the wafer is performed. The defect on the wafer have various sizes and shapes, and there is a need for a technology for extracting all defects without relying on a visual inspection of a worker.

DETAILED DESCRIPTION

According to one embodiment, an information processing apparatus has an acquisitor configured to acquire an entire area image obtained by capturing an entire area of a processing surface of a wafer including at least one defect, a training image selector configured to select, as a training image, a partial image including at least one defect from the entire area image, a model constructor configured to construct a calculation model of generating a label image obtained by extracting and binarizing the defect included in the partial image, and a learner configured to update a parameter of the calculation model based on a difference between the label image generated by inputting the training image to the calculation model and a reference label image obtained by extracting and binarizing the defect of the training image.

Hereinafter, an embodiment of an information processing apparatus will be described with reference to the drawings. Hereinafter, main components of the information processing apparatus will be mainly described, but the information processing apparatus may have components and functions not illustrated or described. The following description does not exclude the components and functions not illustrated or described.

Figure 1:
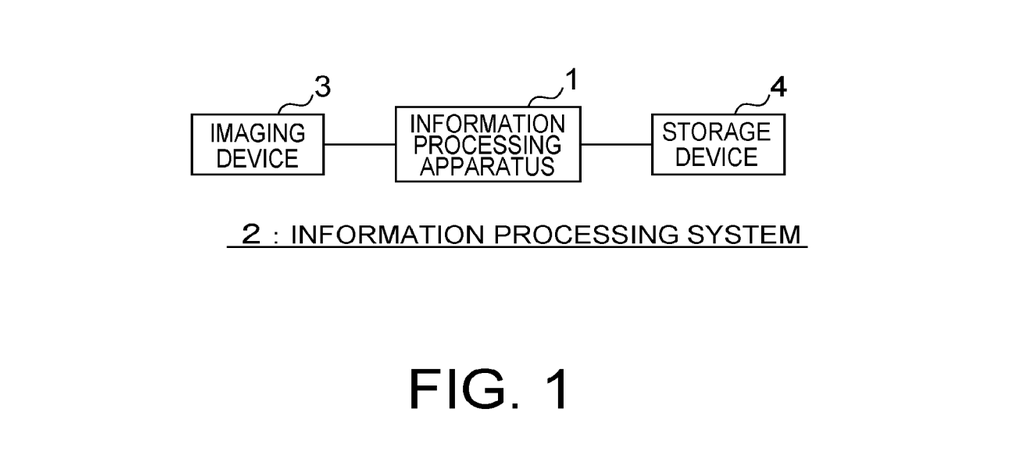
FIG. 1 is a block diagram illustrating a schematic configuration of an information processing system including an information processing apparatus according to an embodiment.

FIG. 1 is a block diagram illustrating a schematic configuration of an information processing system 2 including an information processing apparatus 1 according to the embodiment. The information processing system 2 of FIG. 1 includes an imaging device 3, the information processing apparatus 1, and a storage device 4.

The imaging device 3 captures an entire area of a processing surface of a wafer. An entire area image of the wafer captured by the imaging device 3 is input to the information processing apparatus 1. The imaging device 3 may be provided inside the information processing apparatus 1.

The information processing apparatus 1 extracts defects in the wafer based on the entire area image of the wafer captured by the imaging device 3. A processing operation of the information processing apparatus 1 can be performed by, for example, a general-purpose computer. As will be described later, the information processing apparatus 1 constructs a model that generates and outputs a label image representing the defects from the entire area image of the wafer. The model is generated by using, for example, a deep convolutional neural network (DCNN). Parameter information, label information, and the like of the DCNN are stored in the storage device 4. The storage device 4 is a hard disk, a non-volatile memory, or the like. The storage device 4 may be provided inside the information processing apparatus 1.

Figure 2:
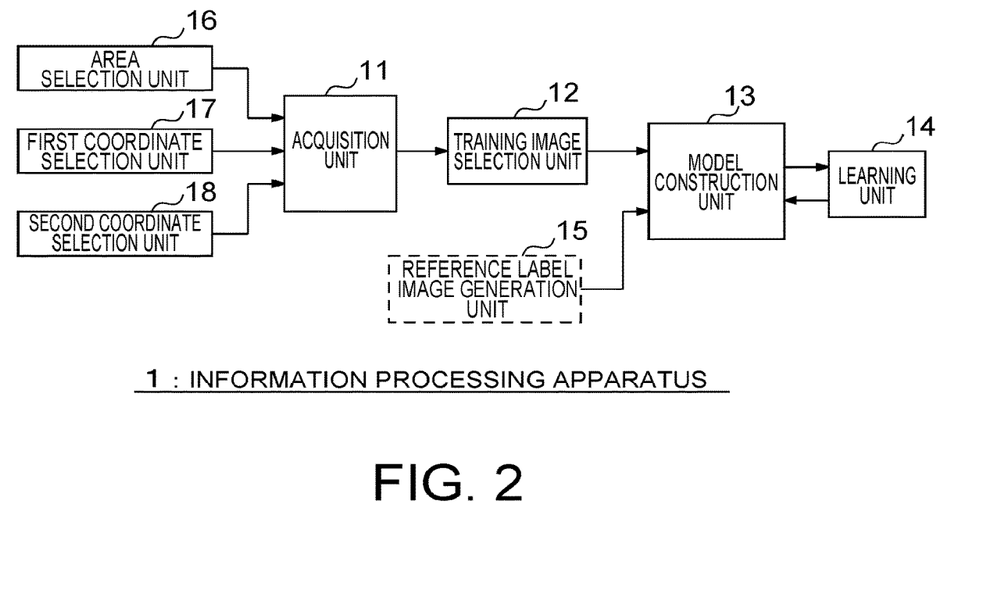
FIG. 2 is a functional block diagram illustrating processing contents of the information processing apparatus.

FIG. 2 is a functional block diagram illustrating processing contents of the information processing apparatus 1. The information processing apparatus 1 includes an acquisition unit 11, a training image selection unit 12, a model construction unit 13, and a learning unit 14.

The acquisition unit 11 acquires the entire area image obtained by capturing the entire area of the processing surface of the wafer including at least one defect. The entire area image is captured by the imaging device 3. The acquisition unit 11 may acquire information regarding a specific area in the entire area image as will be described later.

The training image selection unit 12 selects, as a training image, a partial image including at least one defect from the entire area image. In the present embodiment, for example, it is assumed that the label image is automatically generated from the partial image by using the DCNN, and the training image is used to update a parameter of the DCNN.

A reference label image generation unit 15 indicated by a broken line in FIG. 2 extracts the defect included in the training image and generates a binarized reference label image. The reference label image is an image obtained by extracting and binarizing only a defect portion included in the training image, and does not include shape information other than the defect. The reference label image does not include shading information and color information of the defect portion. For example, the reference label image is an image in which the defect portion is represented in white and a non-defect portion is represented in black. Since the reference label image may be generated manually by a human, the reference label image is indicated by the broken line in FIG. 2.

The model construction unit 13 constructs a calculation model that extracts the defect included in the partial image and automatically generates a binarized label image. The calculation model is also called a defect extraction model. The calculation model is a model constructed by using the DCNN. When the partial image is input to the calculation model, calculation processing is performed in the DCNN, and the label image corresponding to the input partial image is automatically generated. In the present embodiment, parameters of the calculation model are updated by using the training image and the reference label image. The update of the parameters is also called learning.

The learning unit 14 updates the parameter of the calculation model based on a difference between the label image generated by inputting the training image into the calculation model and the reference label image obtained by extracting and binarizing the defect of the training image. As will be described later, the DCNN in the calculation model has an updatable parameter, and the label image automatically generated from the input partial image changes by changing a value of the parameter. The parameter is also called a convolutional kernel. The learning unit 14 updates the parameter of the DCNN such that when the partial image is input to the DCNN, the label image approximate to the reference label image as close as possible is automatically generated. More specifically, the DCNN includes a combination of a convolutional layer and a pooling layer, and the parameter of each layer can be adjusted arbitrarily. Thus, the learning unit 14 updates the parameter of each layer of the DCNN based on the difference between the reference label image and the automatically generated label image.

The calculation model of a learning process in the learning unit 14 and the calculation model in which the learning in the learning unit 14 is completed are input to the storage device 4 of FIG. 1.

The information processing apparatus 1 illustrated in FIG. 2 may include an area selection unit 16. The area selection unit 16 selects an area from the entire area image of the wafer. The area is a partial image area set in advance in the entire area image as will be described later. The area may be set by a human, or may be automatically set by a computer or the like. The area selection unit 16 may select only one area from a plurality of areas set in the entire area image, or may sequentially select two or more areas. The learning unit 14 may update the parameters of the calculation model based on differences between a plurality of label images generated by inputting a plurality of partial images selected from the plurality of areas into the calculation model and a plurality of corresponding reference label images.

The information processing apparatus 1 illustrated in FIG. 2 may include a first coordinate selection unit 17 and a second coordinate selection unit 18. The first coordinate selection unit 17 randomly selects a coordinate position in a first direction in the area. The second coordinate selection unit 18 randomly selects a coordinate position in a second direction intersecting the first direction in the area. The training image selection unit selects, as training images, partial images having a predetermined size including the coordinate positions selected by the first coordinate selection unit 17 and the second coordinate selection unit 18 from the image in the area. For example, the training image selection unit 12 selects, as the training images, partial images having a predetermined size by using the coordinate positions selected by the first coordinate selection unit 17 and the second coordinate selection unit 18 as center coordinates. The first coordinate selection unit 17 randomly selects, for example, a plurality of coordinate positions in the first direction in the area, and the second coordinate selection unit 18 randomly selects, for example, a plurality of coordinate positions in the second direction in the area. In this case, the training image selection unit 12 may select, as a plurality of training images, a plurality of partial images having a predetermined size including the plurality of coordinate positions selected by the first coordinate selection unit 17 and the second coordinate selection unit 18 from the image in the area.

The training image selection unit 12 may select, as the training image, a partial image selected from a random location in the entire area image. More specifically, the first coordinate selection unit 17 may randomly select the coordinate position in the first direction in the entire area image, and the second coordinate selection unit 18 may randomly select the coordinate position in the second direction intersecting the first direction in the entire area image. In this case, the training image selection unit 12 selects, as the training images, partial images having a predetermined size including the coordinate positions selected by the first coordinate selection unit 17 and the second coordinate selection unit 18 from the images in the entire area image.

Figure 3:
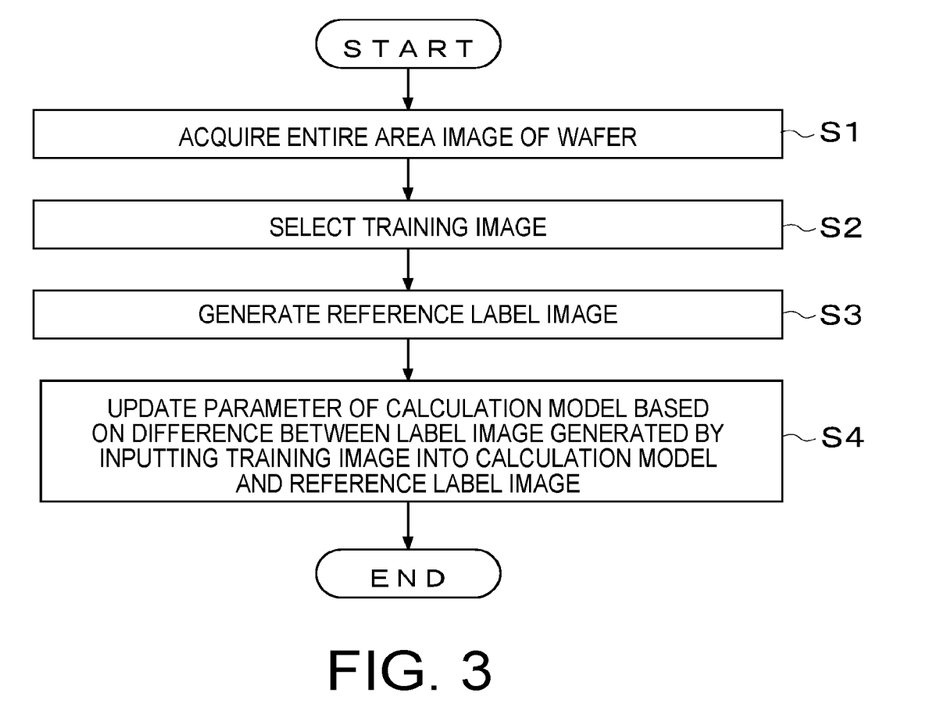
FIG. 3 is a flowchart illustrating an example of a processing operation of the information processing apparatus of FIG. 2.

FIG. 3 is a flowchart illustrating an example of the processing operation of the information processing apparatus 1 of FIG. 2. First, the acquisition unit 11 acquires the entire area image of the wafer captured by the imaging device 3 (step S1). Here, it is assumed that the entire area image includes at least one defect.

Subsequently, the training image selection unit 12 selects, as the training image, the partial image including at least one defect from the entire area image of the wafer (step S2). The partial image is also called a cropped wafer image. An image size of the partial image is not particularly limited.

Subsequently, the reference label image generation unit 15 generates the reference label image from the partial image (step S3). The reference label image may be generated manually by a human or automatically by using a computer or the like. When the reference label image is automatically generated, the reference label image is generated by a method different from the calculation model.

Subsequently, the learning unit 14 updates the parameter of the calculation model based on the difference between the label image generated by inputting the training image into the calculation model and the reference label image (step S4). The updated calculation model is stored in the storage device 4.

Figure 4:
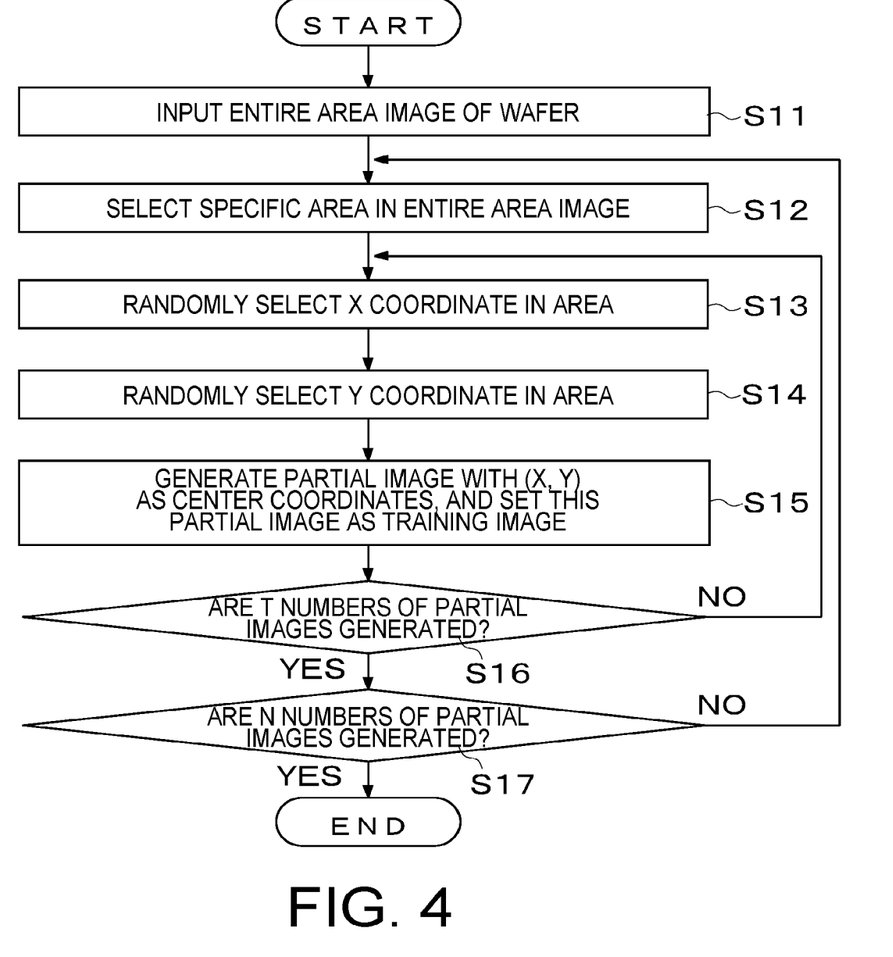
FIG. 4 is a flowchart illustrating processing of step S2 of FIG. 3 in detail.

FIG. 4 is a flowchart illustrating the processing of step S2 of FIG. 3 in detail. The flowchart of FIG. 4 is performed by the training image selection unit 12.

First, the entire area image acquired by the acquisition unit 11 is input (step S11). Subsequently, a specific area in the entire area image is selected (step S12). The flowchart of FIG. 4 assumes that a plurality of areas is set in advance in the entire area image. The plurality of areas is locations in which the defects are to be extracted in the entire area image. The plurality of areas may be set in advance by a human, or may be automatically set by a computer or the like. In step S12, one area is selected from the plurality of areas. The area of step S12 may be selected by a human, or may be randomly or sequentially selected by a computer or the like.

Figure 5:
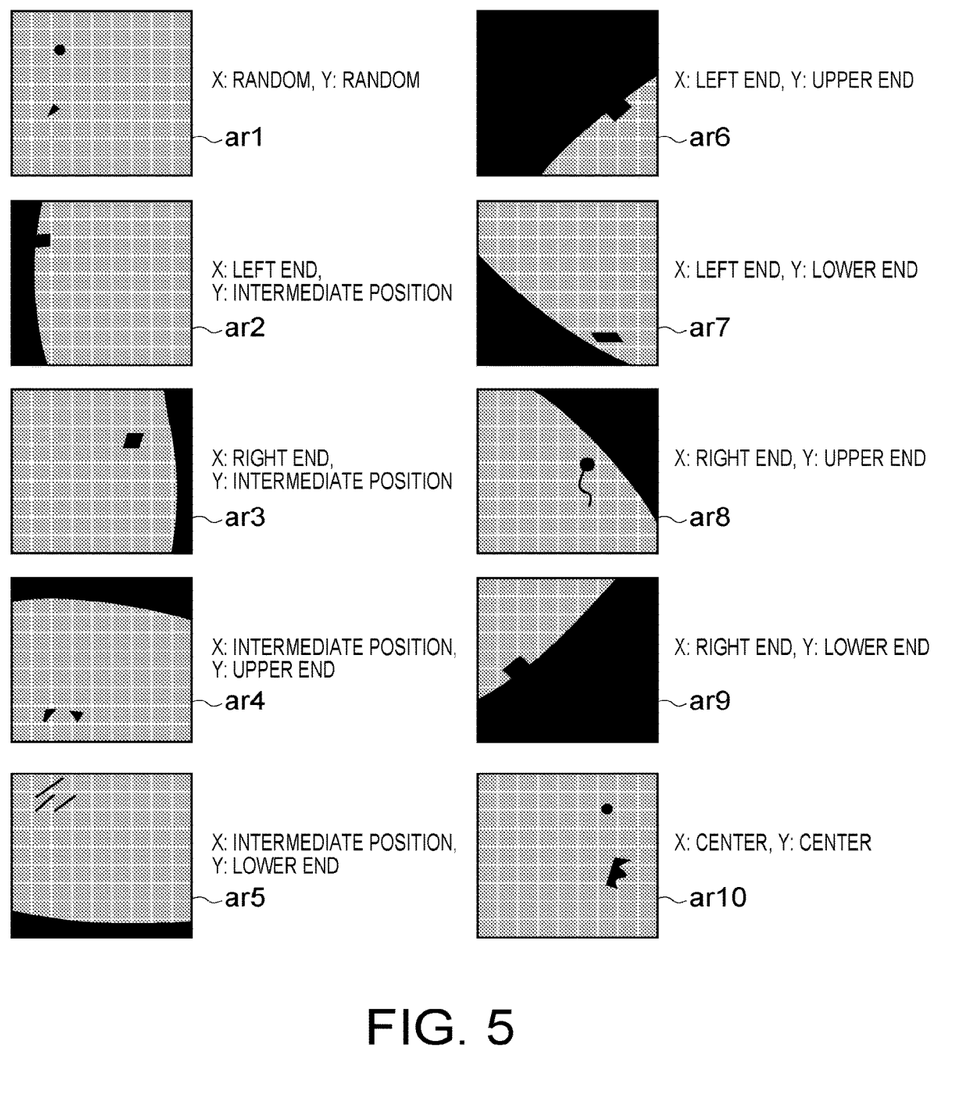
FIG. 5 is a diagram schematically illustrating an example of a plurality of areas set in advance in an entire area image of a wafer.

FIG. 5 is a diagram schematically illustrating an example of the plurality of areas set in advance in the entire area image of the wafer. FIG. 5 illustrates an example in which the plurality of areas is set mainly to extract the defect near an outer periphery of the wafer. FIG. 5 illustrates an example in which 10 areas are set in the entire area image, but the number of set areas is not particularly limited. Area ar1 is an area obtained by randomly designating coordinates (X, Y) from the entire area image of the wafer. Area ar2 is an area in which a first direction X is positioned at a left end and a second direction Y is positioned at an intermediate position in the entire area image. Area ar3 is an area in which the first direction X is positioned at a right end and the second direction Y is positioned at the intermediate position in the entire area image. Area ar4 is an area in which the first direction X is positioned at the intermediate position and the second direction Y is positioned at an upper end in the entire area image. Area ar5 is an area in which the first direction X is positioned at the intermediate position and the second direction Y is positioned at a lower end in the entire area image. Area ar6 is an area in which the first direction X is positioned at the left end and the second direction Y is positioned at the upper end in the entire area image. Area ar7 is an area in which the first direction X is positioned at the left end and the second direction Y is positioned at the lower end in the entire area image. Area ar8 is an area in which the first direction X is positioned at the right end and the second direction Y is positioned at the upper end in the entire area image. Area ar9 is an area in which the first direction X is positioned at the right end and the second direction Y is positioned at the lower end in the entire area image. Area ar10 is an area in which the first direction X is positioned at a center and the second direction Y is positioned at the center in the entire area image.

After the selection of the area in step S12 of FIG. 4 is ended, the X coordinate in the area is randomly selected (step S13), and then the Y coordinate in the area is randomly selected (step S14). The processing order of steps S13 and S14 may be reversed. Here, it is assumed that the area has a rectangular shape defined in the X direction and the Y direction, and in step S13, the X coordinate in the area is arbitrarily selected. The expression of "random" means that any selection method can be used. For example, the coordinate in the X (or Y) direction in the area may be sequentially selected from a minimum coordinate position to a maximum coordinate position.

Subsequently, a partial image having a predetermined size with the coordinates (X, Y) selected in steps S13 and S14 as the center coordinates is generated, and the generated partial image is used as the training image (step S15). Since it is assumed that the partial image includes at least one defect, the predetermined size is determined such that the partial image includes the defect. An upper limit of the predetermined size is set such that the entire area of the partial image is included in the area.

Subsequently, it is determined whether or not T (T is an integer of 2 or more) numbers of partial images are generated in the area selected in step S12, and the processing of steps S13 to S15 is performed until the T numbers of partial images are generated (step S16).

As described above, in the processing of FIG. 4, a plurality of partial images each having the defect is selected as the plurality of training images in the selected area.

Subsequently, it is determined whether or not the plurality of partial images and the plurality of training images are selected for each of preset N (N is an integer of 1 or more) numbers of areas (step S17). The processing of steps S12 to S17 is repeated until the selection of the plurality of partial images and the plurality of training images for the N numbers of areas is completed.

An example in which the plurality of areas is set in advance in the entire area image of the wafer is illustrated in the flowchart of FIG. 4, but the plurality of partial images and the plurality of training images may be selected without setting the areas as will be illustrated below.

Figure 6:
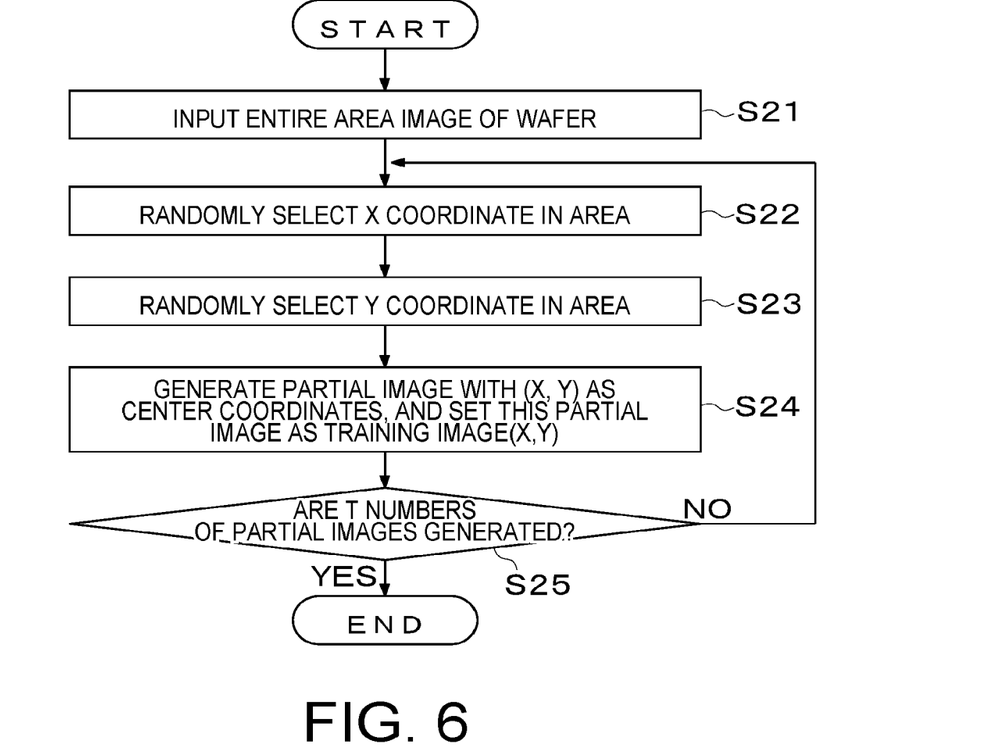
FIG. 6 is a flowchart according to a modification example illustrating in detail the processing of step S2 of FIG. 3.

FIG. 6 is a flowchart based on a modification example illustrating in detail the process of step S2 of FIG. 3. First, the entire area image of the wafer is input (step S21). Subsequently, the X coordinate in the entire area image is randomly selected (step S22), and then the Y coordinate in the entire area image is randomly selected (step S23). The processing order of steps S22 and S23 may be reversed.

Subsequently, the partial image having a predetermined size with the coordinates (X, Y) selected in steps S22 and S23 as the center coordinates is generated, and the generated partial image is used as the training image (step S24). Similar to step S15 in FIG. 4, the predetermined size is determined such that the defect is included in the partial image.

Subsequently, it is determined whether or not the T numbers of partial images and the T numbers of training images are selected (step S25), and the processing of steps S22 to S25 is repeated until the T numbers of partial images and the T numbers of training images are selected.

Figure 7:
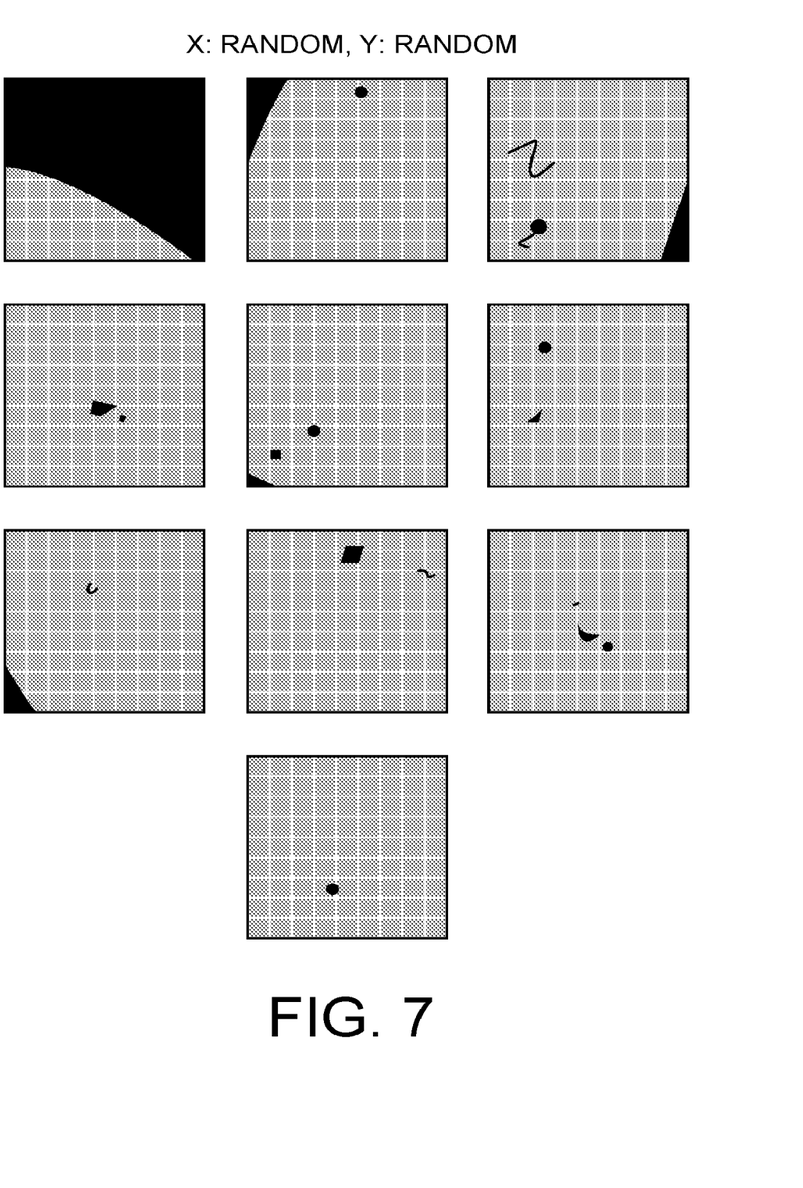
FIG. 7 is a diagram schematically illustrating an example of a plurality of partial images and training images selected in step S24 of FIG. 6.

FIG. 7 is a diagram schematically illustrating an example of the plurality of partial images and the plurality of training images selected in step S24 of FIG. 6. In a second processing procedure illustrated in FIG. 6, since the coordinates (X, Y) in the entire area image are randomly selected each time, the partial image and the training image of the random location in the wafer are selected.

Figure 8:
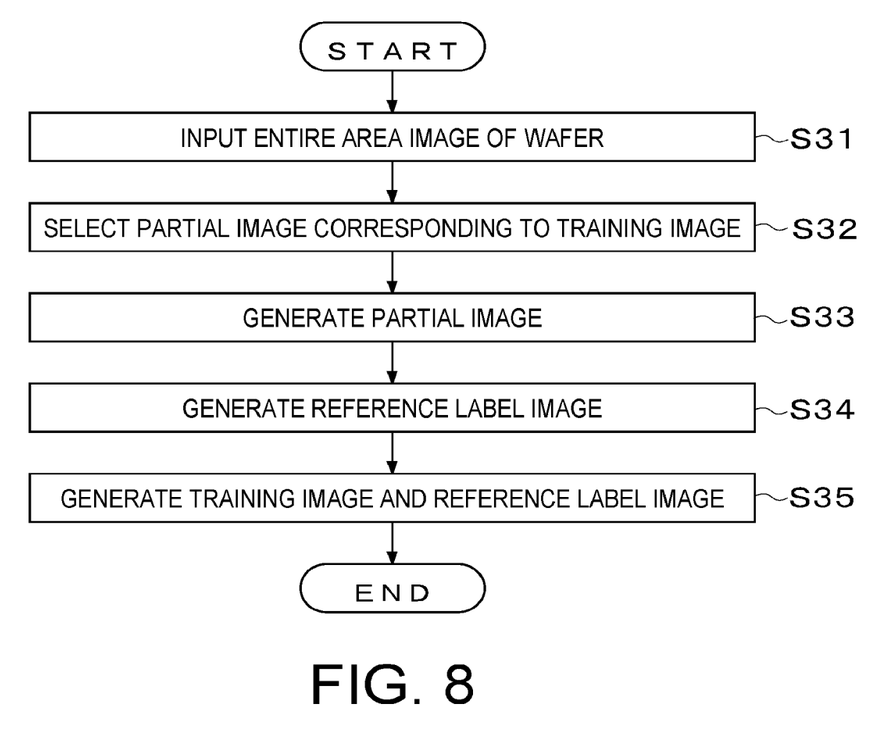
FIG. 8 is a flowchart illustrating processing of step S3 of FIG. 3 in detail.

FIG. 8 is a flowchart illustrating the processing of step S3 in FIG. 3 in detail. First, the entire area image of the wafer acquired in step S1 of FIG. 3 is input (step S31). Subsequently, the partial image corresponding to the training image selected in step S2 of FIG. 3 is selected (step S32).

Subsequently, the augmentation of the partial image is performed (step S33). The augmentation of the partial image is, for example, the augmentation of contrast, brightness, or the like.

Subsequently, the reference label image generation unit 15 generates the reference label image based on the partial image after the augmentation (step S34). As described above, the processing of step S34 may be performed manually by a human or automatically by a computer or the like.

The training image and the reference label image are output based on the processing result of step S34 (step S35).

Figure 9A:
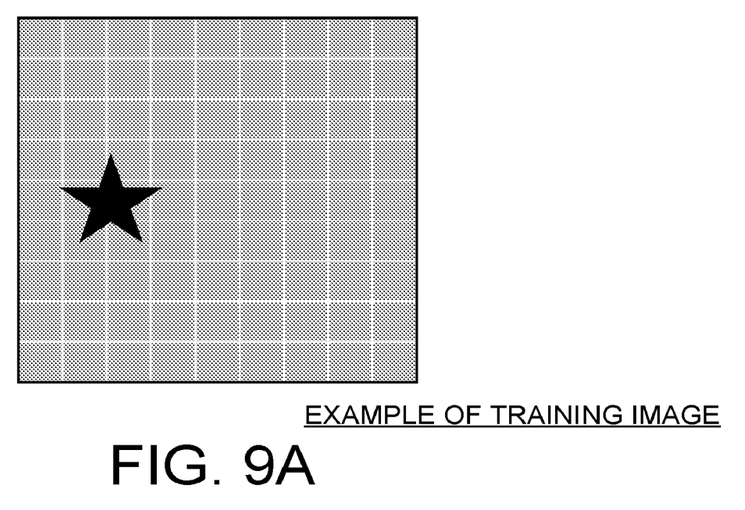
FIG. 9A is a diagram illustrating an example of a training image output in step S34 of FIG. 8.
Figure 9B:
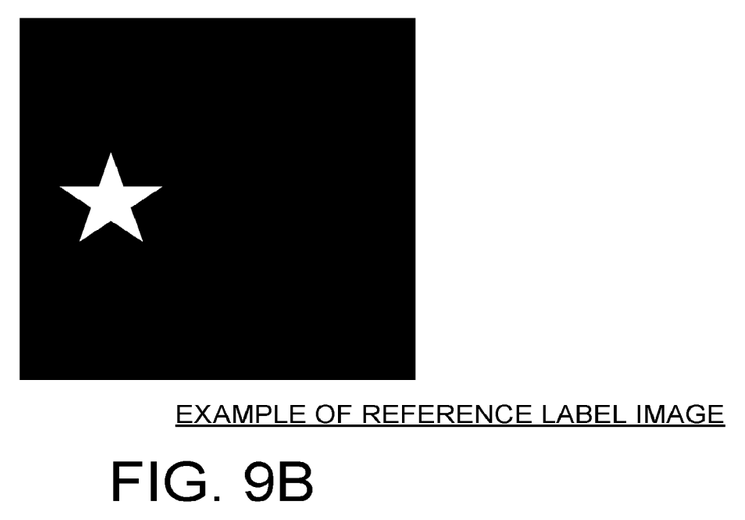
FIG. 9B is a diagram illustrating an example of a reference label image output in step S34 of FIG. 8.

FIGS. 9A and 9B are diagrams illustrating an example of the training image and the reference label image output in step S34 of FIG. 8. As illustrated in the diagrams, the reference label image is an image obtained by extracting and binarizing only the defect portion of the training image.

Figure 10:
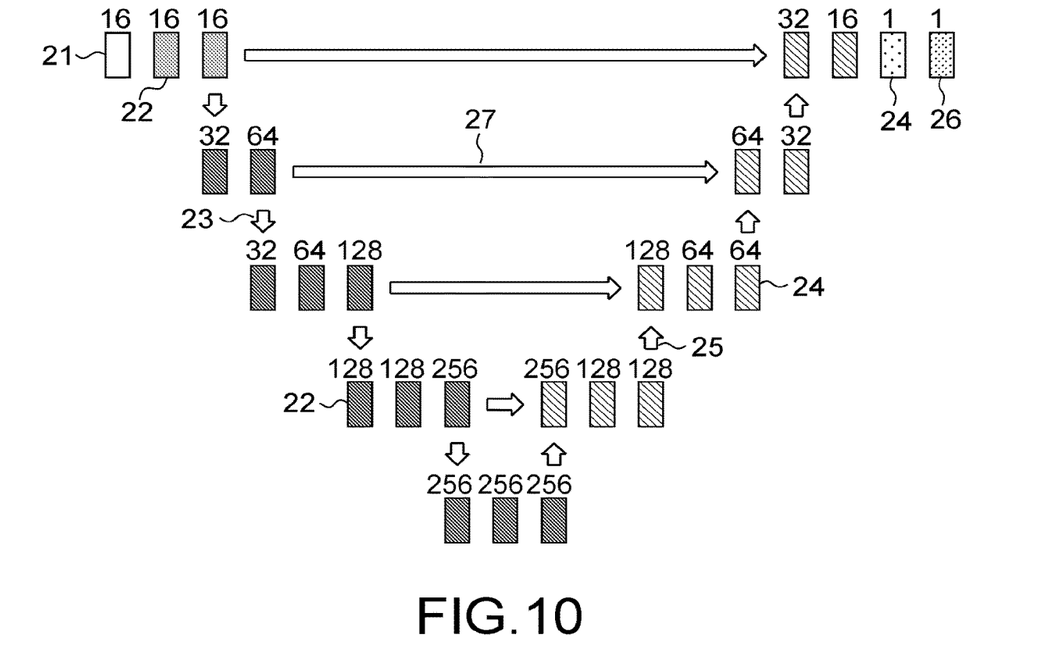
FIG. 10 is a diagram illustrating an example of a DCNN used in a calculation model constructed by a model construction unit.

FIG. 10 is a diagram illustrating an example of a DCNN 20 used in the calculation model constructed by the model construction unit 13. The DCNN 20 of FIG. 10 has an input unit 21, a convolutional layer 22, a pooling layer 23, a deconvolutional layer 24, an unpooling layer 25, and an output unit 26. At the learning stage, the training image is input to the input unit 21. The convolutional layer 22 performs filter processing on the training image, and performs processing of condensing feature points. The pooling layer 23 reduces or enlarges the training image while retaining features contained in the training image.

The DCNN 20 of FIG. 10 is divided into a plurality of stages in a vertical direction illustrated in the diagram and is divided into two in a horizontal direction. A plurality of convolutional layers 22 is provided at each stage of the left half. At each stage of the left half, the image size does not change and the number of channels doubles whenever the training image passes through one convolutional layer 22. The channel represents, for example, an image having a different color. Each rectangle in FIG. 10 indicates a unit of processing such as the convolutional layer 22 or the deconvolutional layer 24, and a number above each rectangle indicates the number of channels.

The image size changes at the plurality of stages in the vertical direction. A down arrow indicates the pooling layer 23, and max pooling processing is performed. In the max pooling processing, for example, for the left half of the DCNN 20, the image size is halved without changing the number of channels at each stage from top to bottom.

On the other hand, a plurality of deconvolutional layers 24 and a plurality of unpooling layers 25 are provided on the right half of the DCNN 20. In the right half of the DCNN 20, the image size doubles from bottom to top without changing the number of channels at each stage, and the image size at the uppermost of the left half is the same as the image size at the uppermost of the right half. In the example of FIG. 10, the number of channels of the training image input to the input unit 21 is 16, and the number of channels of the image at the lowermost stage is 256. The number of channels at the uppermost stage of the right half is 32, and then a label image of one channel is finally output from the output unit 26 by passing through the plurality of convolutional layers 22 and the plurality of deconvolutional layers 24 arranged in the horizontal direction.

The stages of the right half and the left half of FIG. 10 are connected by arrows 27 in the horizontal direction. The arrows 27 in the horizontal direction means that a defect image included in the training image is copied from the image at each stage on the right side to the image at the corresponding stage on the left side. Accordingly, at each stage on the left side, the defect image from the right side is combined with the image from the bottom, and the image including the defect is generated.

The learning unit 14 performs a plurality of stages of processing from the uppermost stage on the left side of the DCNN 20 of FIG. 10 to the lowermost stage in the center, and then performs processing up to the uppermost stage on the right side. The series of processing is called a forward propagation calculation. In the forward propagation calculation, processing of doubling the number of channels while halving the image size of the training image input to the input unit 21 and then halving the number of channels while increasing the image size.

The learning unit 14 calculates the difference between the label image output from the output unit 26 and the reference label image output in step S34 of FIG. 8. This difference is called a dice loss. The learning unit 14 calculates a gradient of the parameter of each stage by performing back propagation calculation in a direction opposite to the forward propagation calculation based on the dice loss. When the gradient for each stage is calculated, the parameters for all the stages are updated together by using these gradients.

Figure 11:
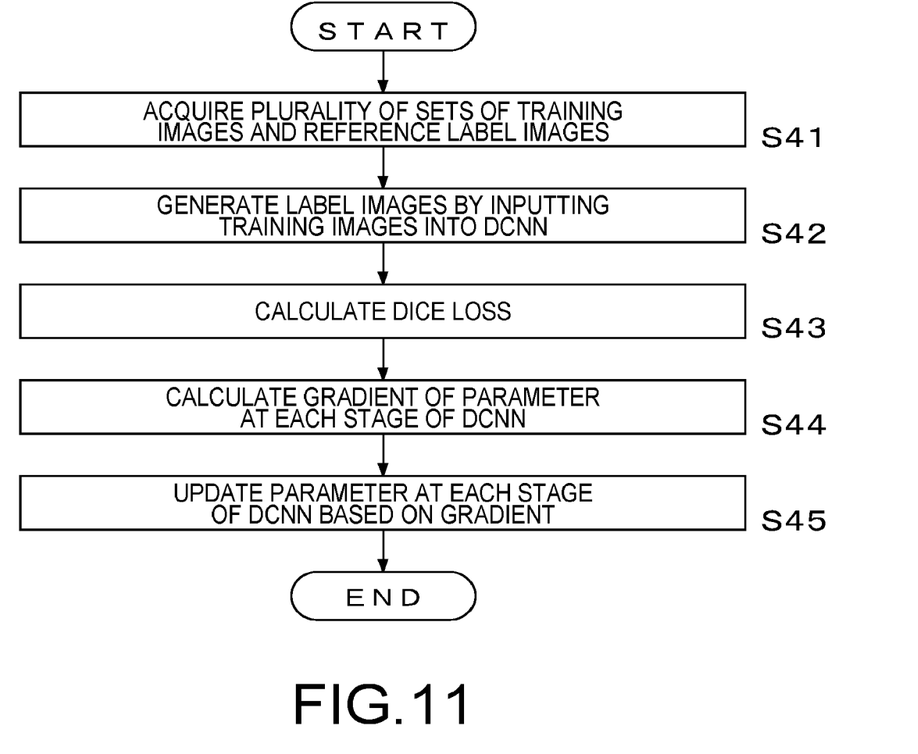
FIG. 11 is a flowchart illustrating processing of step S4 of FIG. 3 in detail.

FIG. 11 is a flowchart illustrating the processing of step S4 of FIG. 3 in detail. The learning unit 14 performs the processing of the flowchart of FIG. 11 according to the configuration of the DCNN 20 of FIG. 10. First, a plurality of sets including the training image and the corresponding reference label image as one set is acquired (step S41). The reason why the plurality of sets of training images and reference label images is acquired is that the parameters of the DCNN 20 cannot be updated accurately when only one set is used, and the parameters are updated based on an average of a plurality of differences obtained by using the plurality of sets of training images and reference label images.

Subsequently, the label images are generated by sequentially inputting the training images to the input unit 21 of the DCNN 20 and performing the forward propagation calculation described above (step S42). The label image is output from the output unit 26 of the DCNN 20. The label image is generated for each of the plurality of training images.

Subsequently, the dice loss which is the difference between each label image and the reference label image is calculated (step S43). The dice loss is calculated for each label image.

Subsequently, the gradient of the parameter at each stage of the DCNN 20 is calculated by performing the back propagation operation described above based on the dice loss (step S44). The gradient of the parameter is also calculated for each label image.

Subsequently, the parameters of the stages of the DCNN 20 are updated together based on the calculated gradient of each label image (step S45).

Steps S41 to S45 of FIG. 11 are repeated for the plurality of sets acquired in step S41.

It is determined that the DCNN 20 in which the parameters are repeatedly updated with a sufficient number of sets of training images and reference label images is learned and is used for a macro inspection of a wafer to be inspected. In this case, the entire area image of the wafer to be inspected is captured by the imaging device 3, and the partial images in the entire area image are input to the input unit 21 of the DCNN 20. Accordingly, the label images corresponding to the input partial images are output from the output unit 26 of the DCNN 20.

As described above, in the present embodiment, the partial image including the defect is selected as the training image from the entire area image of the wafer, and the reference label image obtained by binarizing the defect included in the training image is generated. Thereafter, since the parameters of the DCNN 20 are updated by using the training image and the reference label image, the parameters of the DCNN 20 can be updated more quickly than when the parameters of the DCNN 20 are updated based on the entire area image of the wafer. An arbitrary partial image in the entire area image of the wafer is input to the learned DCNN 20 in which the parameters are sufficiently updated, and thus, the label image obtained by binarizing the defect can be generated with high resolution and high accuracy. Accordingly, a position and a type of the defect on the wafer can be quickly extracted. Therefore, the information processing apparatus 1 according to the present embodiment is used, and thus, the macro inspection of the wafer can be performed at high speed, high accuracy, and high resolution.

At least a part of the information processing apparatus described in the above-described embodiment may be achieved by hardware or software. When the at least a part thereof is achieved by software, a program that achieves at least a part of the functions of the information processing apparatus may be stored in a recording medium such as a flexible disk or a CD-ROM, and may be read and executed by a computer. The recording medium is not limited to an attachable and detachable medium such as a magnetic disk or an optical disk, and may be a fixed recording medium such as a hard disk device or a memory.

The program that achieves at least a part of the functions of the information processing apparatus may be distributed via a communication line (including wireless communication) such as the Internet. The program may be distributed via a wired line or a wireless line such as the Internet in a state of being encrypted, modulated, and compressed or in a state of being stored in the recording medium.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An information processing apparatus comprising:
   an acquisitor configured to acquire an entire area image obtained by capturing an entire area of a processing surface of a wafer including at least one defect;
   a training image selector configured to select, as a training image, a partial image including at least one defect from the entire area image;
   a model constructor configured to construct a calculation model of generating a label image obtained by extracting and binarizing the defect included in the partial image; and
   a learner configured to update a parameter of the calculation model based on a difference between the label image generated by inputting the training image to the calculation model and a reference label image obtained by extracting and binarizing the defect of the training image.

2. The information processing apparatus according to claim 1, wherein
   the training image selector is configured to acquire, as a plurality of the training images, a plurality of the partial images in which pixel positions of at least a part in the entire area image are different and each of which includes at least one defect, and
   the learner is configured to sequentially calculate differences between a plurality of the label images generated by sequentially inputting the plurality of training images to the calculation model and the corresponding reference label images, and sequentially update parameters of the calculation model.

3. The information processing apparatus according to claim 1, wherein
   the training image selector is configured to select, as the training image, the partial image included in an area selected from the entire area image.

4. The information processing apparatus according to claim 3, further comprising:
   an area selector configured to select the area from the entire area image, wherein
   the training image selector is configured to select, as the training image, the partial image included in the area selected from the entire area image.

5. The information processing apparatus according to claim 4, wherein
   the training image selector is configured to acquire, as the training image, the partial image positioned at a random location in the area.

6. The information processing apparatus according to claim 5, further comprising:
   a first coordinate selector configured to randomly select a coordinate position in the area in a first direction; and
   a second coordinate selector configured to randomly select a coordinate position in the area in a second direction intersecting the first direction, wherein
   the training image selector is configured select, as the training image, the partial image having a predetermined size including the coordinate positions selected by the first coordinate selector and the second coordinate selector from the image in the area.

7. The information processing apparatus according to claim 6, wherein
   the training image selector is configured to select, as the training image, the partial image having the predetermined size with the coordinate positions selected by the first coordinate selector and the second coordinate selector as center coordinates.

8. The information processing apparatus according to claim 7, wherein
   the first coordinate selector is configured to randomly select a plurality of coordinate positions in the area in the first direction,
   the second coordinate selector is configured to randomly select a plurality of coordinate positions in the area in the second direction, and
   the training image selector is configured to select, as a plurality of the training images, a plurality of the partial images having a predetermined size each including the plurality of coordinate positions selected by the first coordinate selector and the second coordinate selector from the image in the area.

9. The information processing apparatus according to claim 4, wherein
   the area selector is configured to sequentially select a plurality of the areas provided at different locations in the entire area image, and
   the learner is configured to update parameters of the calculation model based on differences between a plurality of label images generated by inputting a plurality of the partial images selected from the plurality of areas into the calculation model and a plurality of the corresponding reference label images.

10. The information processing apparatus according to claim 1, wherein
    the training image selector is configured to select, as the training image, the partial image selected from a random location in the entire area image.

11. The information processing apparatus according to claim 10, further comprising:
    a first coordinate selector configured to randomly select a coordinate position in the entire area image in a first direction; and
    a second coordinate selector configured to randomly select a coordinate position in the entire area image in a second direction intersecting the first direction, wherein
    the training image selector is configured to select, as the training image, the partial image having a predetermined size including the coordinate positions selected by the first coordinate selector and the second coordinate selector from the image in the entire area image.

12. An information processing method comprising:

acquiring an entire area image obtained by capturing an entire area of a processing surface of a wafer including at least one defect;

selecting, as a training image, a partial image including at least one defect from the entire area image;

constructing a calculation model of generating a label image obtained by extracting and binarizing the defect included in the partial image; and updating a parameter of the calculation model based on a difference between the label image generated by inputting the training image to the calculation model and a reference label image obtained by extracting and binarizing the defect of the training image.

13. The information processing method according to claim 12, wherein the selecting the partial image comprises acquiring, as a plurality of the training images, a plurality of the partial images in which pixel positions of at least a part in the entire area image are different and each of which includes at least one defect, and the updating the parameter further comprises:

sequentially calculating differences between a plurality of the label images generated by sequentially inputting the plurality of training images to the calculation model and the corresponding reference label images, and sequentially updating parameters of the calculation model.

14. The information processing method according to claim 12, wherein the selecting the partial image comprises selecting, as the training image, the partial image included in an area selected from the entire area image.

15. The information processing method according to claim 14, wherein the selecting the partial image further comprises:

selecting the area from the entire area image, and selecting, as the training image, the partial image included in the area selected from the entire area image.

16. The information processing method according to claim 15, wherein the training image selector comprises acquiring, as the training image, the partial image positioned at a random location in the area.

17. The information processing method according to claim 16, wherein the selecting the partial image further comprises:

randomly selecting a coordinate position in the area in a first direction;

randomly selecting a coordinate position in the area in a second direction intersecting the first direction, and selecting, as the training image, the partial image having a predetermined size including the coordinate positions randomly selected in the first direction and the second direction.

18. The information processing method according to claim 17, wherein the selecting the partial image comprises selecting, as the training image, the partial image having the predetermined size with the coordinate positions randomly selected in the first direction and the second direction.

19. The information processing method according to claim 18, wherein the selecting the partial image further comprises:

randomly selecting a plurality of coordinate positions in the area in the first direction, randomly selecting a plurality of coordinate positions in the area in the second direction, and selecting, as a plurality of the training images, a plurality of the partial images having a predetermined size each including the plurality of coordinate positions randomly selected in the first direction and the second direction.

20. The information processing method according to claim 15, wherein the selecting the partial image further comprises:

sequentially selecting a plurality of the areas provided at different locations in the entire area image, and updating parameters of the calculation model based on differences between a plurality of label images generated by inputting a plurality of the partial images selected from the plurality of areas into the calculation model and a plurality of the corresponding reference label images.

* * * * *